United States Patent [19]
Takimoto et al.

[11] Patent Number: 5,306,323
[45] Date of Patent: Apr. 26, 1994

[54] FIBER COUPLER MANUFACTURING APPARATUS HAVING AN AUTOMATIC BREAKING TEST DEVICE

[75] Inventors: Hiroaki Takimoto; Hiroshi Suganuma, both of Kanagawa; Kazuhiko Arimoto, Tokyo, all of Japan

[73] Assignees: Sumitomo Electric Industries, Ltd., Osaka; Sumiden Opcom, Ltd., Tokyo, both of Japan

[21] Appl. No.: 907,023

[22] Filed: Jul. 1, 1992

[30] Foreign Application Priority Data

Jul. 2, 1991 [JP] Japan .................. 3-50921[U]

[51] Int. Cl.⁵ .......................................... C03B 37/023
[52] U.S. Cl. .......................................... 65/3.11; 65/2; 65/11.1
[58] Field of Search ............ 65/3.11, 3.12, 2, 11.1

[56] References Cited

U.S. PATENT DOCUMENTS

| | | | |
|---|---|---|---|
| 4,736,632 | 4/1988 | Case | 73/827 |
| 4,765,816 | 8/1988 | Bjornlie et al. | 65/3.11 X |

FOREIGN PATENT DOCUMENTS

| | | |
|---|---|---|
| 60-232515 | 11/1985 | Japan . |
| 61-055615 | 3/1986 | Japan . |
| 2-114213 | 4/1990 | Japan . |
| 3-150507 | 6/1991 | Japan . |

*Primary Examiner*—Robert L. Lindsay
*Attorney, Agent, or Firm*—Cushman, Darby & Cushman

[57] ABSTRACT

The present invention provides a fiber coupler manufacturing apparatus comprising a pair of fiber holding portions and a fiber clamp disposed on each of the fiber holding portions for holding at least two optical fibers. A weight and pulley system is arranged wherein a first weight is coupled to each of the fiber holding portions to pull the fiber holding portions away from each other to apply tension to the optical fibers. A heating unit is disposed between the fiber holding portions and proximate to the optical fibers to heat the optical fibers. A second weight is coupled to either the fiber holding portions or the first weight and rests on a movable platform. As the movable platform descends in a vertical direction, the second weight applies additional force to the fiber holding portions and thus applies additional tension to the optical fibers.

9 Claims, 5 Drawing Sheets

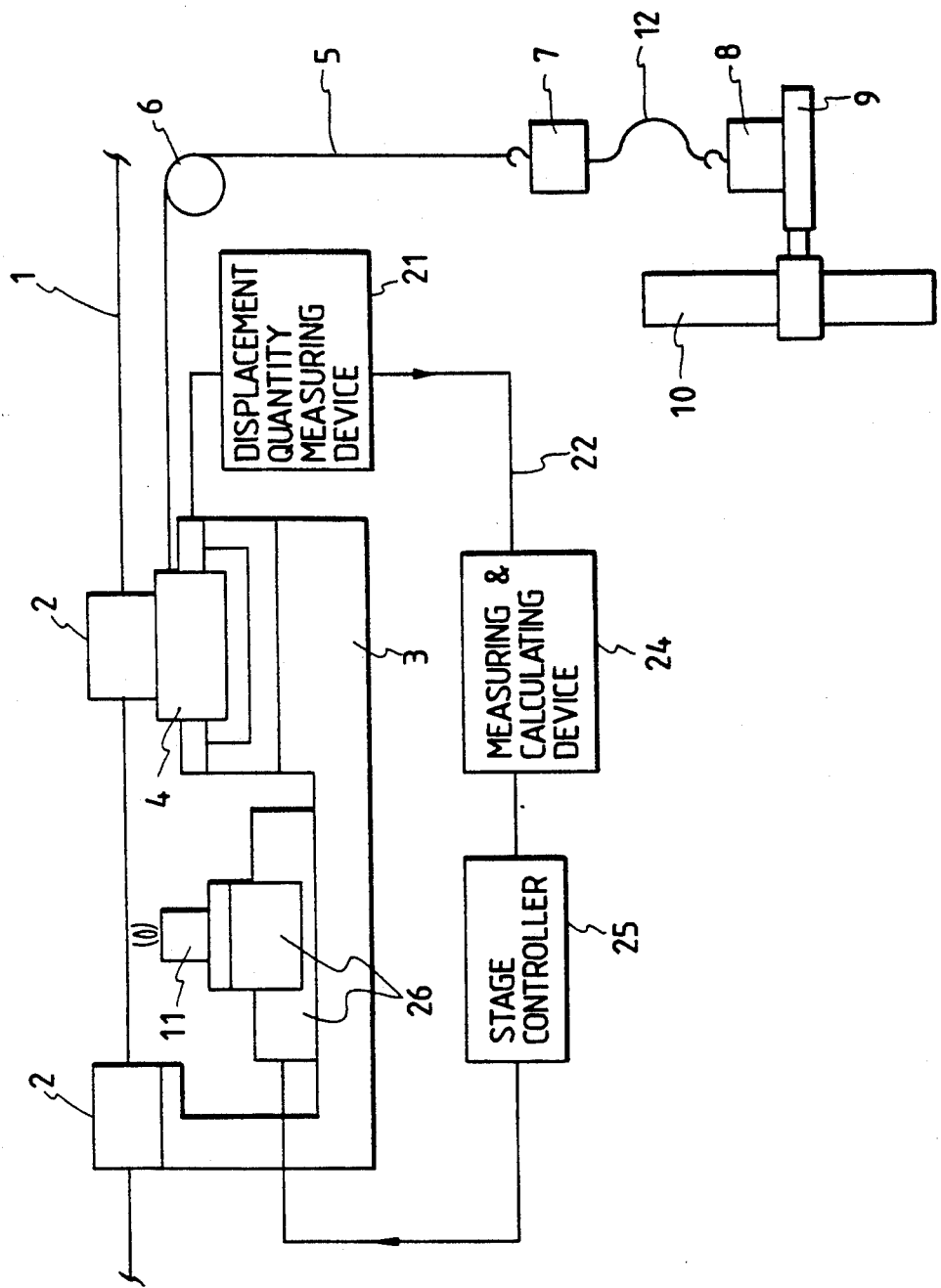

FIBER COUPLER MANUFACTURING APPARATUS HAVING AN AUTOMATIC BREAKING TEST DEVICE

BACKGROUND OF THE INVENTION

1. Field of the Invention

The present invention relates to an apparatus which utilizes a fusion-elongation method to manufacture fiber couplers which couple a plurality of optional fibers.

2. Description of the Related Art

A fusion-elongation method has been used to manufacture fiber couplers from a plurality of optional fibers. The method includes a terminal treatment step, a fusion-elongation step, and a reinforcing step. However, problems can arise which affect the production of the fiber couplers and the reliability and characteristics of the couplers produced. These problems can be caused by operator error. Therefore, it is described to have an apparatus that performs the above steps automatically.

An automatic apparatus for manufacturing fiber couplers is described in Japanese Patent Unexamined Publication No. Sho-60-232515 and comprises fiber holding portions and a wire connected at one end to the fiber holding portions, drawn through pulleys and at the other end having a weight connected thereto. In addition, each fiber holding portion comprising an air float bearing for movably supporting the fiber holding portion.

A method for improving the reliability of a fiber coupler is described in Japanese Patent Unexamined Publication No. Hei-2-114213. In this method, after the fusion-elongation step is performed, a breaking test is performed wherein tension is applied to the fiber coupler. In the above method, a fiber coupler is manufactured using the above manufacturing apparatus, however, an operator performs a breaking test on the fiber coupler by applying tension to the manufactured fiber coupler. Therefore, the possibility of operator error is introduced and thus, the reliability of the fiber coupler is reduced.

SUMMARY OF THE INVENTION

It is therefore an object of the present invention to provide an automatic apparatus for manufacturing high reliability fiber couplers.

In order to attain the above object, according to the present invention, the fiber coupler manufacturing apparatus comprises a pair of fiber holding portions for holding at least two optional fibers and at least one supporting portion for supporting at least one of the fiber holding portions movably in a direction of an optical axis (longitudinal) of the optical fibers. The apparatus further comprises a first device for pulling the pair of fiber holding portions away from each other to apply a predetermined tension to the optical fibers. The first pulling device comprises a wire connected to both fiber holding portions and having a weight attached thereto. The weight is positioned to place tension on the wire thus pulling the holding portions away from each other.

The apparatus further comprises a second device for pulling the pair of fiber holding portions away from each other to increase the tension applied to the optical fibers. The second pulling device comprises a wire connected to both fiber holding portions and having a second weight attached thereto. A support deck is provided that is movable in a vertical direction for supporting the second weight such that as the support deck descends, the second weight exerts additional force on the fiber holding portions and thus increases the tension applied to the optical fibers. By increasing the tension being applied to the optical fibers, the breaking test is, in essence, performed on the optical fiber coupler with tension larger than the predetermined tension that is applied to the optical fibers by the first weight only.

BRIEF DESCRIPTION OF THE DRAWINGS

FIG. 5 is a side view showing the fiber coupler manufacturing apparatus according to a further embodiment of the present invention.

DETAILED DESCRIPTION OF THE PREFERRED EMBODIMENTS

Figure 1:
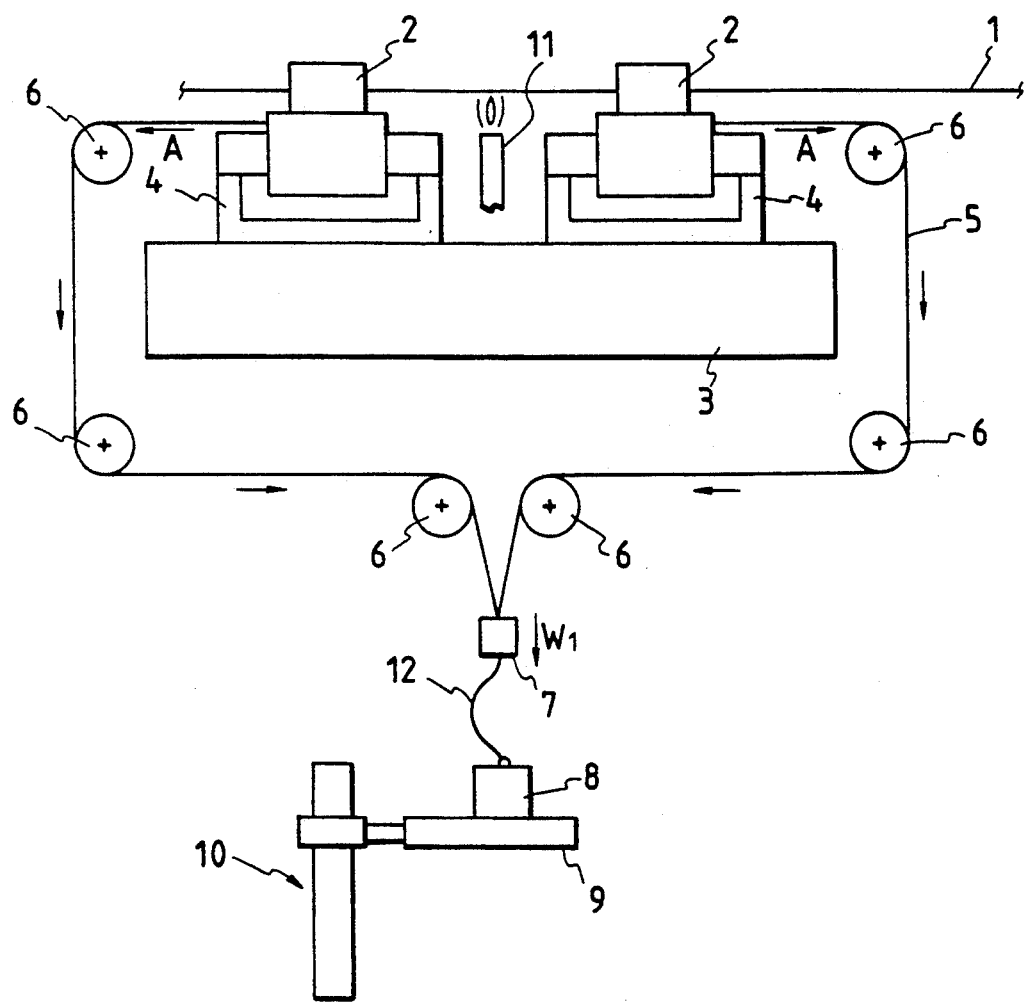
FIG. 1 is a side view showing the fiber coupler manufacturing apparatus according to an embodiment of the present invention when only predetermined tension is applied.

The fiber coupler manufacturing apparatus according to an embodiment of the present invention as shown in FIG. 1 comprises fiber clamps 2, a back block 3, fiber holding portion 4, a wire 5, pulleys 6, weights 7 and 8, a table 9, and a movable device 10. The pair of fiber holding portions 4 are fixed on the upper surface of the base block 3 and a heating unit 11 is provided therebetween. Each of the fiber holding portions 4 comprises an air float-type bearing and is supported by the bearing so that the fiber clamp 2 can move in a predetermined direction. A plurality of coated optical fibers 1 are bundled and secured by the fiber clamps 2 substantially in parallel and in close contact with each other.

A coating of the optical fibers 1 is partially removed between the pair of fiber clamps 2 thereby exposing the optical fibers 1 so that the flame of the heating device 11 directly contacts the optical fibers. The wire 5 is connected to the fiber holding portions 4 and is directed through the plurality of pulleys 6 to a position below the fiber holding portions 4. The weight 7 is hung from the wire 5 to apply tension to the wire 5. This tension causes the pair of fiber holding portions 2 to be pulled away from each other so that predetermined tension is applied to the optical fibers 1.

Figure 2:
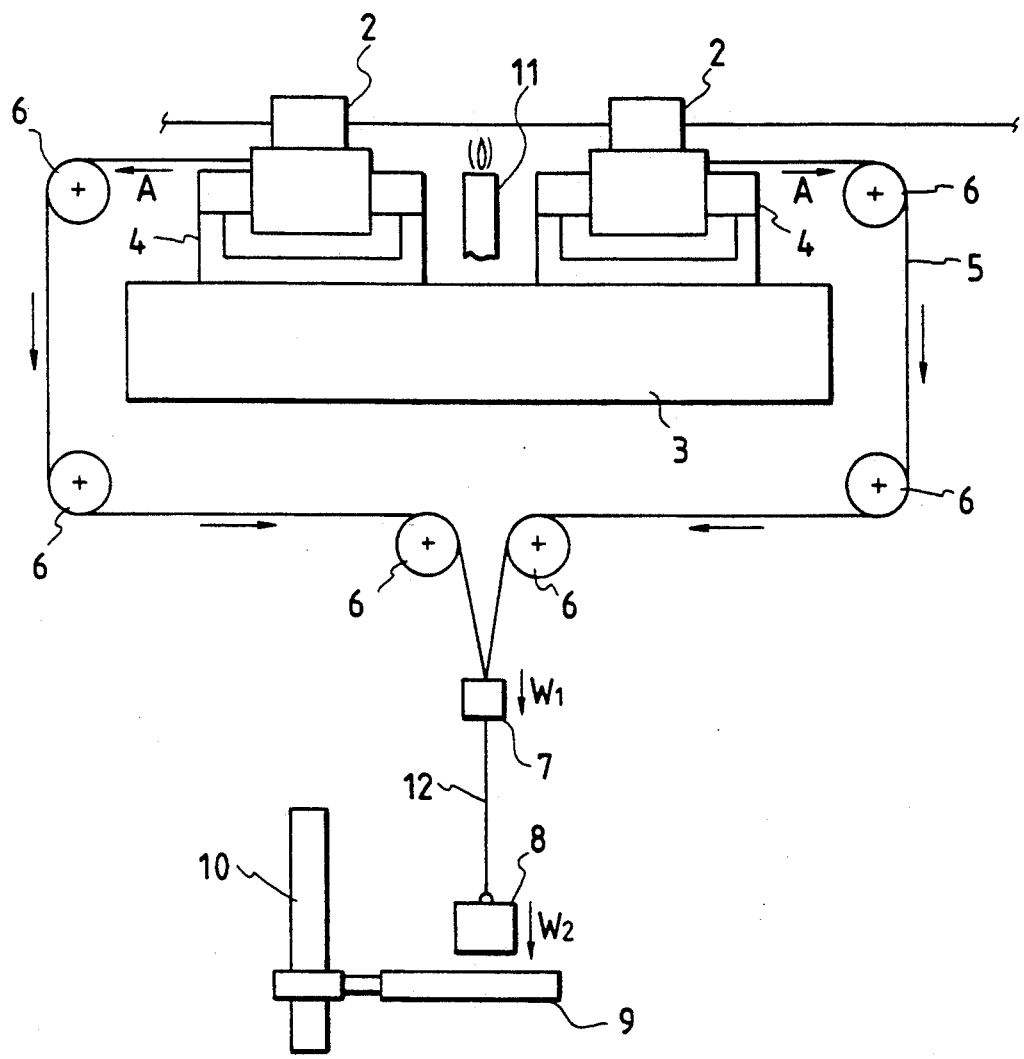
FIG. 2 is a side view showing the fiber coupler manufacturing apparatus according to the embodiment of the present invention when additional tension is applied.

A wire 12 is connected at one end to the weight 7, and at its other end to the weight 8 which sets on the upper portion of the table 9. The table 9 is held by the movable device 10 and can be stopped at at least two positions in the vertical direction. When the table 9 is held at the upper portion of the movable device 10, the wire 12 is slack because the distance between the weights 7 and 8 is shorter than the length of the wire 12. As a result, only the weight 7 applies tension to the wire 5. However, as shown in FIG. 2, when the table 9 is held at a lower portion of the movable device 10 the weight 8 hangs from the wire 12 because the distance between the weights 7 and 8 is longer than the length of the wire 12. Therefore, the weights 7 and 8 apply tension to the wire 5.

Figure 3:
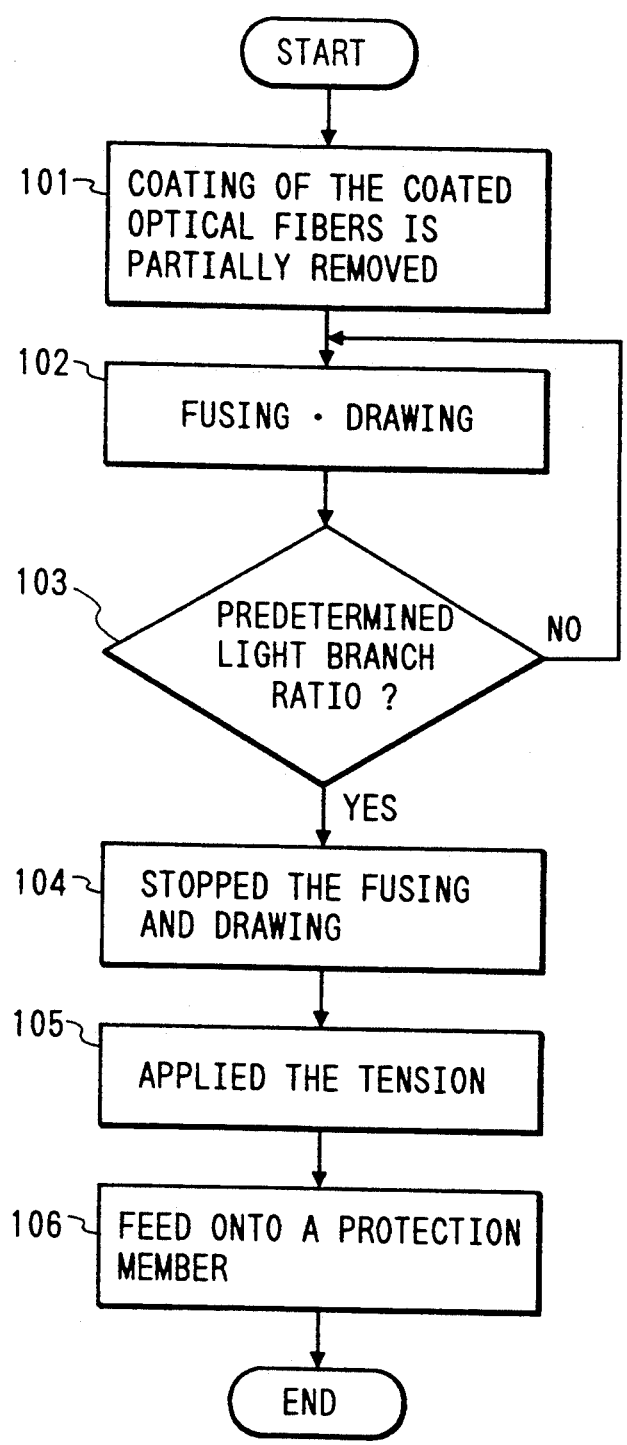
FIG. 3 is a flowchart illustrating the process of manufacturing fiber couplers according to the present invention.

FIG. 3 is a flowchart illustrating the steps performed in the fiber coupler manufacturing method of the above apparatus. The coatings of the coated optical fibers 1 are partially removed (step 101), and the portion of the coated optical fibers 1 where the coatings have been removed are positioned in close contact with each other by the fiber clamps 2. The closely contacting portions of the coated optical fibers 1 are fused by the heating unit 11 and elongated in the direction of the optical axial as shown by arrows "A" in FIG. 1 (step 102). The heating unit 11 is provided proximate to the coupler forming portion and can be easily automatically ignited by using a conventional technique. Also, the heating unit 11 can remain on and may be moved in a direction perpendicular to the optical fibers 1.

During the fusing step, tension is applied to the wire 5 and the pulleys 6 by weight 7 and thus the fiber clamps 2 are pulled away from each other. Therefore, tension is uniformly applied to the optical fibers 1 that are secured to the fiber clamps 2 and no excessive tension is applied thereto. Hence, the optical fibers 1 are smoothly drawn and the coupler forming portion of the optical fibers 1 is deformed bi-conically so that a coupler portion is formed.

Optimum elongation and fusing times can be determined by using known methods. For example, the forming and elongation times can be based on a light branching ratio that the coupler is desired to have. The light branching ratio of the coupler can be measured by applying light to one end at the optical fibers and detecting the amount of light exiting the opposite ends of the optical fibers (step 103). Therefore, the heating unit 11 can be automatically deactivated when this predetermined light branch ratio has been obtained (step 104).

In the fiber coupler manufacturing apparatus according to this embodiment, a breaking test can be easily and automatically performed along with the series of steps, that is, the fusing, elongation, and molding steps, so that the production and reliability of the fiber couplers can be improved. The breaking test is performed on the formed coupler portion by applying a predetermined tension to the optical fibers 1 (step 105).

In particular, after the heating unit is deactivated, the table 9 held by the movable device 10 is automatically descended until the weight 8 hangs from the weight 7 and no longer rests on the table 9. (FIG. 2) The total weight of the weights 7 and 8 is therefore applied to the wire 5 and thus the tension applied to the coupler portion of the optical fibers 1 is increased. Because the tension is applied by using the weights 7 and 8 and pulleys 6, no excessive force can be applied to the optical fibers 1 by an operator. Also, only the coupler portion which is not broken by the breaking test is secured to a protective member (a reinforcing casing) by an adhesive such as epoxy resin or the like (step 106).

Figure 4:
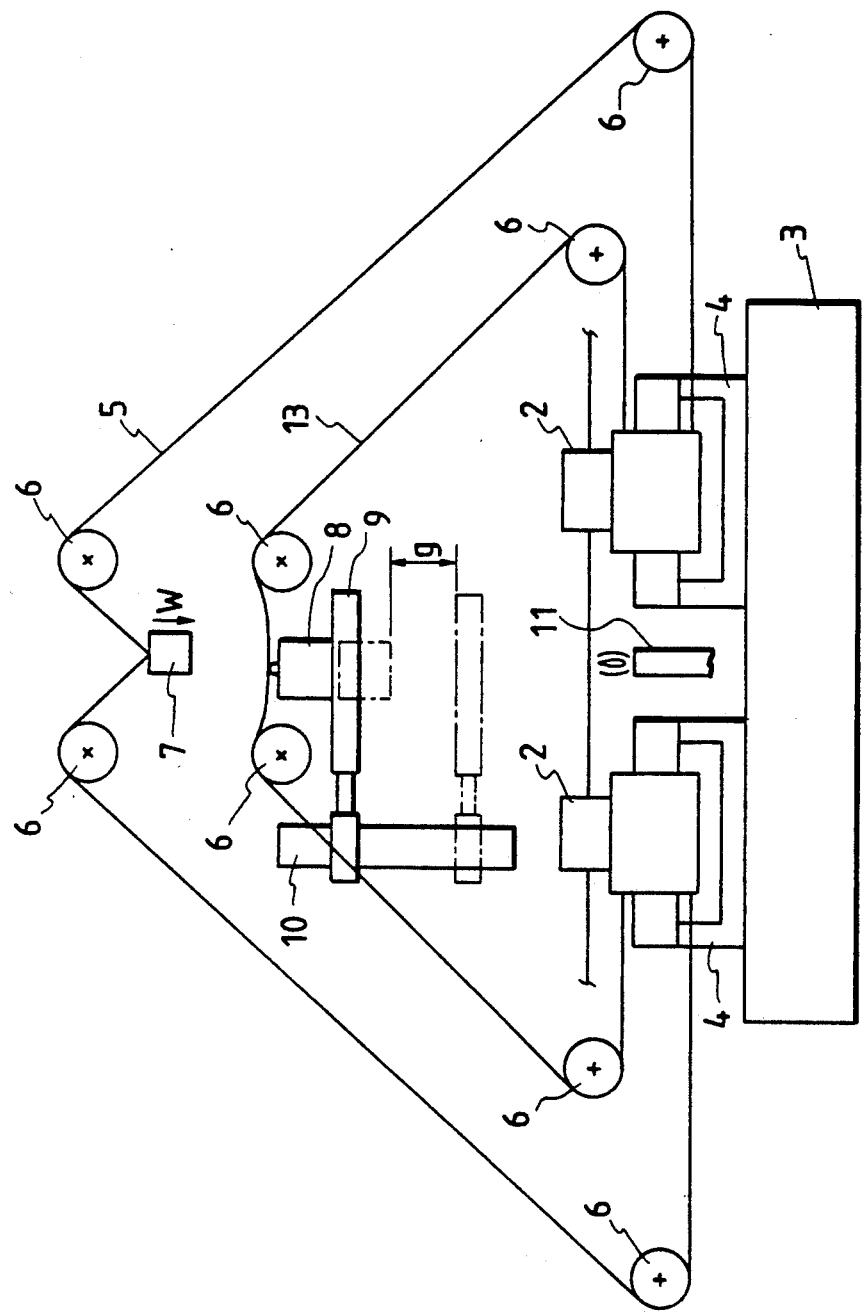
FIG. 4 is a side view showing the fiber coupler manufacturing apparatus according to another embodiment of the present invention.

Another embodiment of the present invention is shown in FIG. 4. A fiber coupler manufacturing apparatus according to this embodiment is different from the embodiment of FIG. 1 in that weights 7 and 8 are respectively hung from two wires 5 and 13 which are coupled to fiber holding portions 4. The arrangement of the wire 5, pulleys 6, and weight 7 is fundamentally similar to the arrangement in the previous embodiment except that the weight 7 is disposed above the fiber holding portions 4. Therefore, detailed explanation of this arrangement is omitted from the following description.

The wire 13 is connected at one end to the fiber holding portions 4, and the weight 8 is hung from the wire 13. The weight 8 is set on the upper surface of a table 9, and the table 9 is held by a movable device 10 which can be stopped at at least two positions in the vertical direction as in the embodiment of FIG. 1. In FIG. 4, upper and lower stopping positions of the table 9 along the movable device 10 are represented by solid and broken lines, respectively. When the table 9 is stopped at the lower position, the weight 8 hangs at a distance above the table 9 as shown by the broken line. As a result, tension is applied to the wires 5 and 13 by weights 7 and 8, respectively, and this tension pulls the fiber holding portions 4 away from each other to perform a braking test on the coupler portion of the optical fibers. The table 9 held by the movable device 10 is made to descend after the fusing and elongation steps have been completed to increase the tension exerted on the optical fibers 1 and thus automatically perform the breaking strength test.

The present invention is not limited to the above embodiments. Also, the system for applying the second weight is not limited to the arrangement wherein the second weight is connected to the first weight 7 or the fiber holding portions 4 by a wire 5 or 13. In addition, although a pair of fiber clamps 2 are supported by a pair of fiber holding portions 4 in the above embodiments, a pair of fiber clamps may be supported by a single fiber holding portion.

Furthermore, although both the fiber holding portions 4 are movable in the above embodiments, one fiber clamp 2 can be stationary and force can be applied only to another clamp 2 mounted on a fiber holding portion 4. In this embodiment, the heating unit 11 may be moved in the direction in which the fibers are elongated and up to half of the length along which the fibers have been elongated.

FIG. 5 shows a further embodiment of the present invention wherein the above method is performed. A measuring device 21 for measuring the amount of displacement is provided in the vicinity of a fiber holding portion 4 and coupled to a measuring and calculating device 24 which is coupled to a stage controller 25. In this embodiment, when optical fibers 1 are drawn by the movement of the fiber holding portion 4, the amount of displacement of the fiber holding portion 4 is measured by the displacement measuring device 21 so that, on the basis of the measured value, the stage controller 25 controls an automatic platform 26 on which a heating unit 11 is disposed. The heating unit 11 moves one half of the displacement of the fiber holding portion 4. When the optical fibers are drawn, the heating unit will move and therefore remain at approximately an equal distance between the stationary fiber clamp and the moving fiber clamp.

As described above in the previous embodiments, in this embodiment, the support deck descends to increase the tension being applied to optical fibers, and therefore automatically performs a breaking test on the fiber coupler. As a result, fiber couplers of high reliability can be automatically manufactured.

Although the preferred embodiment of this invention has been described, it will be obvious to those skilled in the art that various changes and modifications may be made therein without departing from the invention. Therefore, the claims are intended to include all such changes and modifications that fall within the true spirit and scope of the invention.

What is claimed is:

1. A fiber coupler manufacturing apparatus, comprising:

first and second means for holding a plurality of optical fibers, a portion of said plurality of optical fibers being held between said first and second holding means;

first and second means for movably supporting said first and second holding means, respectively, said first and second holding means being movable in a direction substantially parallel to a longitudinal axis of said portion of said optical fibers held between said first and second holding means;

first means for exerting a first predetermined force on said first and second holding means to urge said first and second holding means away from each other along said direction said first exerting means comprising:

a first mass, a first means for coupling said first mass to said first and second holding means, and first means for hanging said first mass, said first hanging means cooperating with said first coupling means to cause said first mass to exert said first predetermined force on said first and second holding means;

second means for exerting a second predetermined force on said first and second holding means to urge said first and second holding means away from each other along said direction, said second exerting means comprising;

a second mass, second means for coupling said second mass to said first mass, and means for selectably supporting said second mass, said supporting means comprising a surface and being movable in a substantially vertical direction between a first position and a second position, said surface contacting said second mass to support said second mass when said supporting means is at said first position and said surface being at a predetermined distance away from said second mass when said supporting means is at said second position to enable said second mass to exert said second predetermined force on said first and second holding means; and means for heating said portion of said plurality of said optical fibers held between said first and second holding means.

2. A fiber coupler manufacturing apparatus as in claim 1, wherein said first hanging means comprises at least one pulley.

3. A fiber coupler manufacturing apparatus, comprising:

first and second means for holding a plurality of optical fibers, a portion of said plurality of optical fibers being held between said first and second holding means;

first and second means for movably supporting said first and second holding means, respectively, said first and second holding means being movable in a direction substantially parallel to a longitudinal axis of said portion of said optical fibers held between said first and second holding means;

first means for exerting a first predetermined force on said first and second holding means to urge said first and second holding means away from each other along said direction, said first exerting means comprising;

a first mass, a first means for coupling said first mass to said first and second holding means, and first means for hanging said first mass, said first hanging means cooperating with said first coupling means to cause said first mass to exert said first predetermined force on said first and second holding means;

second means for exerting a second predetermined force on said first and second holding means to urge said first and second holding means away from each other along said direction, said second exerting means comprising;

a second mass, second means for coupling said second mass to said first and second holding means, second means for hanging said second mass, and means for selectably supporting said second mass, said supporting means comprising a surface and being movable in a substantially vertical direction between a first position and a second position, said surface contacting said second mass to support said second mass when said supporting means is at said first position and said surface being at a predetermined distance away from said second mass when said supporting means is at said second position to enable said second mass to exert said second predetermined force on said first and second holding means; and means for heating said portion of said plurality of said optical fibers held between said first and second holding means, 4. A fiber coupler manufacturing apparatus as in claim 1, wherein said second hanging means comprises at least one pulley.

5. A fiber coupler manufacturing apparatus, comprising:

first and second means for holding a plurality of optical fibers, a portion of said plurality of optical fibers being held between said first and second holding means;

means for movably supporting said first holding means, respectively, said first holding means being movable in a direction substantially parallel to a longitudinal axis of said portion of said optical fibers held between said first and second holding means;

first means for exerting a first predetermined force on said first holding means to urge said first holding means away from said second holding means along said direction, said first exerting means comprising:

a first mass, first means for coupling said first mass to said first holding means, and first means for hanging said first mass, said first hanging means cooperating with said first coupling means to cause said first mass to exert said first predetermined force on said first holding means.

second means for exerting a second predetermined force on said first holding means to urge said first holding means away from said second holding mans along said direction; and means for heating said portion of said plurality of said optical fibers held between said first and second holding means.

6. A fiber coupler manufacturing apparatus as in claim 5 wherein said first hanging means comprises at least one pulley.

7. A fiber coupler manufacturing apparatus as in claim 5 wherein said second exerting means comprises:
   a second mass;
   second means for coupling said second mass to said first mass; and
   means for selectably supporting said second mass, said supporting means comprising a surface and being movable in substantially vertical direction between a first position and a second position, said surface contacting said second mass to support said second mass when said supporting means is at said first position and said surface being at a predetermined distance away from said second mass when said supporting means is at said second position to enable said second mass to exert said second predetermined force on said first holding means.

8. A fiber coupler manufacturing apparatus as in claim 3, wherein said first hanging means comprises at least one pulley.

9. A fiber coupler manufacturing apparatus as in claim 3, wherein said second hanging means comprises at least one pulley.

* * * * *